Nov. 15, 1927.　　　　　　　　　　　　　　1,649,678
E. FREIVOGEL
TIRE RIM
Filed Jan. 7, 1927

Inventor
Ernest Freivogel
By Chamberlain + Newman
Attorneys

Patented Nov. 15, 1927.

1,649,678

UNITED STATES PATENT OFFICE.

ERNEST FREIVOGEL, OF RIDGEFIELD, CONNECTICUT, ASSIGNOR OF ONE-HALF TO RICHARD A. JACKSON, OF RIDGEFIELD, CONNECTICUT.

TIRE RIM.

Application filed January 7, 1927. Serial No. 159,556.

The present invention relates to improvements in solid rims for automobile tires and is applicable either to rims of the demountable type, or to rims formed as a permanent part of disc or wire wheels, an object of the invention being to provide a construction which will permit of the mounting of the tire with the inner tube therein, without the necessity of prying the same on at one point and then gradually forcing the rest of the tire in place, but will enable the whole tire to be slid into place in substantially flat relation with respect to the rim. Heretofore it has been necessary to first completely engage the valve stem with the inner tube in its opening in the rim, and thereupon the tire was gradually forced into place about the rim.

It is proposed, in the present embodiment of the invention, to provide an improved tube-valve receiving structure incorporated in the rim and which will guide the tube-valve into place as the whole tire is pressed upon the rim equally at all points.

A further object is to provide such a structure which will not weaken the rim and which may be incorporated therein in a simple practical manner.

With the above and other objects in view, an embodiment of the invention is shown in the accompanying drawings, and this embodiment will be hereinafter more fully described with reference thereto and the invention will be finally pointed out in the claims.

In the drawings.

Similar reference characters indicate corresponding parts throughout the several figures of the drawings.

Figure 3:
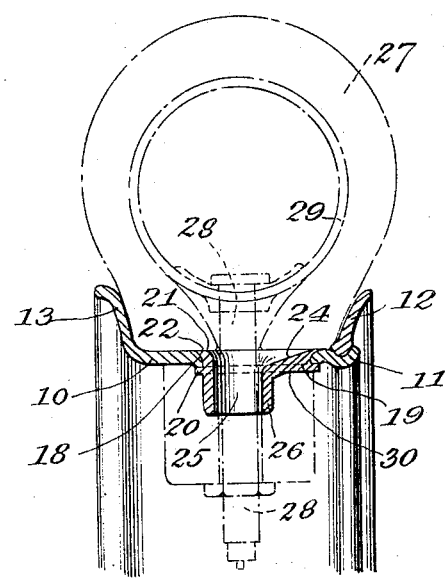
Fig. 3 is an enlarged transverse sectional view of the rim showing the tire in place thereon.
Figure 4:
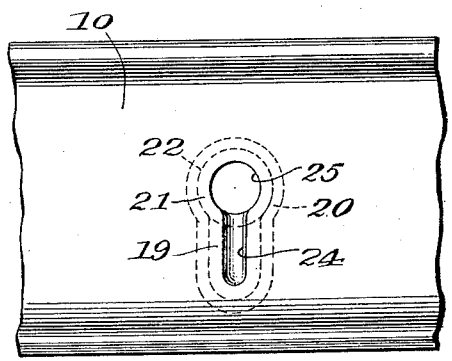
Fig. 4 is a plan view of the valve-stem receiving portion of the rim.

Referring to the drawings, the improved rim construction, according to the present embodiment of the invention, comprises a circular solid rim 10 provided in the usual manner at one edge with a groove 11 adapted to receive the tire retaining split spring ring 12, as shown in Fig. 3, and provided at its other edge with a backing flange 13.

Figure 1:
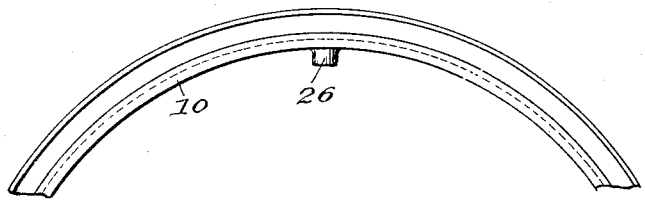
Fig. 1 is a side elevation of a portion of a rim according to the present embodiment of the invention.
Figure 2:
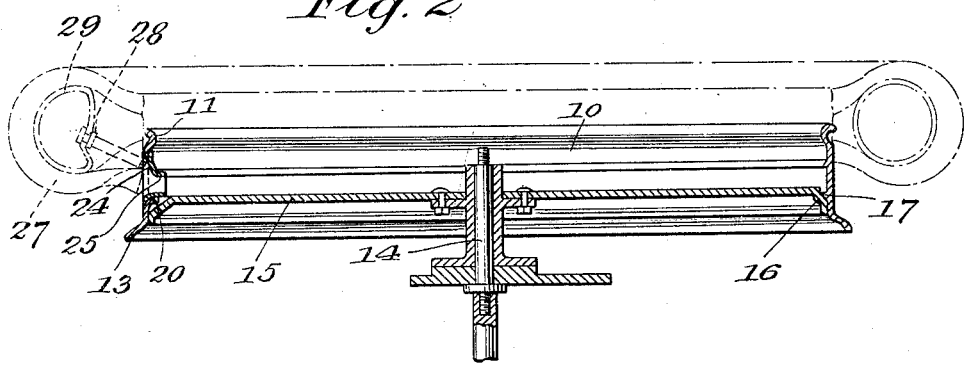
Fig. 2 is a sectional view of the rim showing the same mounted upon a work table, supporting it horizontally, and showing, in dotted lines, the tire partially engaged upon the rim.

As shown in Fig. 2, the rim may be mounted upon a stand or other suitable support, the illustration showing the stand as comprising a center support 14 having a horizontal circular plate 15 mounted thereon and provided at its edge with a stepped flange 16 including a reduced diameter portion adjacent the upper surface of the plate, this flange adapted to receive the rim as shown with one of the ribs 17—usually provided upon the inner surface of the rim— resting upon the shoulder of the flange to thereby rigidly support the rim in horizontal position. This particular type of stand enables the rim to be reversed so that the grooved edge 11 will abut the shoulder of the flange 16, and in this position the tire may be removed from the rim without the use of tools in the case of a new or undamaged tire, and in the case of a tire adhering to the rim for any cause, the same would have to be loosened by the use of a suitable tool.

The rim is provided at one point with an elongated slot 18 extending from the center to a point inwardly removed from the grooved edge 11, this slot being preferably slightly flanged as shown in Fig. 3. Within the slot there is secured the valve-stem guiding and receiving member 19, according to the present embodiment of the invention. This member may be secured in the slot in any suitable manner, or the structure may, if desired, be formed integrally with the rim. As shown, the member is provided at its periphery with a flange 20 spaced from the upper edge and which abuts the lower edge of the flanged edge of the opening 18, the upwardly extending portion 21 of the member disposed within the opening being secured thereto by turning the metal over, as shown at 22, Fig. 3, or by brazing or welding it. In the upper surface of this member there is provided a groove 24 extending downwardly in inclined or horizontal relation from its end adjacent the grooved edge 11 of the rim to an opening 25 provided in said member in line with the central plane of rotation of the rim, said opening being provided with a downwardly-extending guide flange or annulus 26.

As shown in Fig. 2, the tire 27 is engaged upon the upper edge of the rim in flatwise relation—that is, all portions of the tire are equally engaged at the same time, the valve-stem 28 of the inner tube 29 being pressed inwardly so that its outer end is inwardly of the base of the tire, and is positioned at a point in line with the member 19. As the tire is forced downwardly upon the rim, the valve-stem 28 enters the groove 24 thereby positioning the stem against displacement so that it is guided to the valve-stem receiving opening 25 into which it is automatically projected through the elasticity of the inner tube. It will be understood that while the inner tube is partially inflated in the usual manner, the pressure is not such as to prevent pressing in of the valve-stem.

I have illustrated and described a preferred and satisfactory embodiment of the invention, but it is obvious that changes may be made therein within the spirit and scope thereof as defined in the appended claims.

Having thus described my invention, what I claim and desire to secure by Letters Patent is:

1. In a tire-mounting rim having a valve-stem receiving aperture, a grooved portion extending outwardly from said aperture and inclined downwardly towards and entering said aperture and increasing in depth throughout its course.

2. A tire-mounting rim provided at one portion with a transverse slot, and valve-stem guiding and receiving means secured in said slot, and comprising an apertured portion at one end and a grooved portion extending from the other end to said apertured portion.

3. A tire-mounting rim provided at one portion with a transverse slot, and valve-stem guiding and receiving means secured in said slot, and comprising a flanged apertured portion at one end and an inclined grooved portion extending from the other end to said flanged apertured portion.

Signed at Ridgefield in the county of Fairfield and State of Connecticut this 5th day of January A. D. 1927.

ERNEST FREIVOGEL.